United States Patent
Zhao

(10) Patent No.: US 8,380,354 B2
(45) Date of Patent: Feb. 19, 2013

(54) MOTOR CONTROLLER FOR AIR-CONDITIONER FAN AND METHOD FOR CONTROLLING AIR-CONDITIONER FAN

(75) Inventor: Yong Zhao, Zhongshan (CN)

(73) Assignee: Zhongshan Broad-Ocean Motor Manufacturing Co., Ltd., Zhongshan (CN)

( * ) Notice: Subject to any disclaimer, the term of this patent is extended or adjusted under 35 U.S.C. 154(b) by 223 days.

(21) Appl. No.: 12/877,120

(22) Filed: Sep. 8, 2010

(65) Prior Publication Data

US 2011/0190944 A1 Aug. 4, 2011

(30) Foreign Application Priority Data

Feb. 1, 2010 (CN) .......................... 2010 1 0109583

(51) Int. Cl.
- G05B 21/00 (2006.01)
- G05B 13/00 (2006.01)
- G05B 15/00 (2006.01)
- G01M 1/38 (2006.01)
- G05D 23/00 (2006.01)
- G05D 22/02 (2006.01)
- H02P 6/16 (2006.01)
- H02P 6/00 (2006.01)
- F24F 3/14 (2006.01)
- F24F 11/00 (2006.01)

(52) U.S. Cl. ............... 700/278; 318/400.07; 318/400.08; 236/44 C

(58) Field of Classification Search .................. 700/276, 700/278; 318/400.01, 400.07, 400.08, 400.15, 318/400.26, 461; 165/222, 267–269; 236/44, 236/49.1, 49.3, 49.5

See application file for complete search history.

(56) References Cited

U.S. PATENT DOCUMENTS

| | | | | |
|---|---|---|---|---|
| 4,574,283 | A * | 3/1986 | Arakawa et al. | 340/3.51 |
| 4,858,676 | A * | 8/1989 | Bolfik et al. | 165/202 |
| 5,273,105 | A * | 12/1993 | Higashihara et al. | 165/269 |
| 5,653,386 | A * | 8/1997 | Hennessee et al. | 237/12.3 B |
| 5,908,154 | A * | 6/1999 | Sunaga et al. | 236/49.3 |
| 6,456,023 | B1 * | 9/2002 | Becerra et al. | 318/400.26 |
| 6,588,222 | B1 * | 7/2003 | Urbank et al. | 62/127 |
| 7,784,291 | B2 * | 8/2010 | Butler et al. | 62/129 |
| 7,821,218 | B2 * | 10/2010 | Butler et al. | 318/461 |
| 7,843,157 | B2 * | 11/2010 | Archer et al. | 318/504 |
| 8,054,018 | B2 * | 11/2011 | Jeung | 318/400.15 |
| 2009/0208333 | A1 * | 8/2009 | Smith et al. | 416/5 |
| 2010/0101265 | A1 * | 4/2010 | Yokouchi et al. | 62/426 |

* cited by examiner

*Primary Examiner* — Crystal J Barnes-Bullock
(74) *Attorney, Agent, or Firm* — Matthias Scholl P.C.; Matthias Scholl

(57) ABSTRACT

A motor controller for an air-conditioner fan, including at least a central processor, a power drive module, a power supply module, and a communication interface circuit. The power supply module supply working power to the central processor and the power drive module. Multiple instruction input ports are connected to the central processor. Multiple parameters N are set in the central processor and corresponding to the instruction input ports. The central processor controls the power drive module to drive a motor of the air-conditioner fan to operate at a parameter N corresponding to an instruction input port as the instruction input port is connected. The communication interface circuit is communicated with an external communication device. The external communication device changes the parameters N in the central processor corresponding to the instruction input ports via the communication interface circuit.

6 Claims, 1 Drawing Sheet

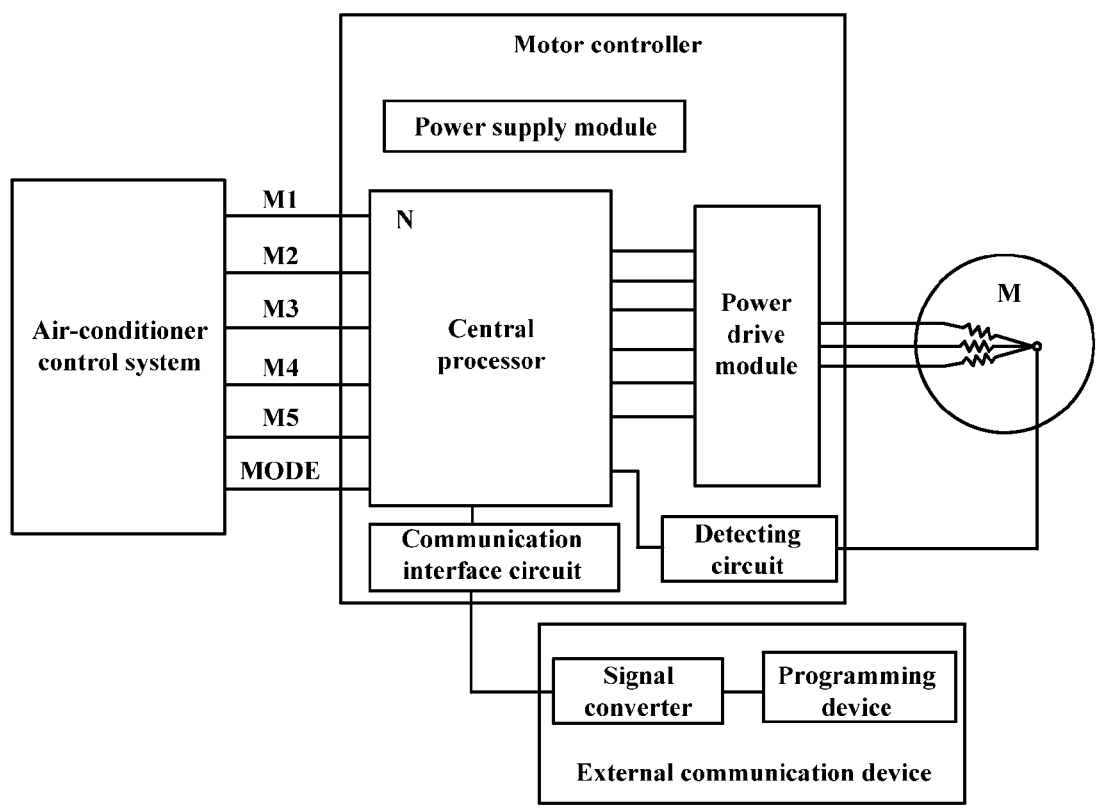

MOTOR CONTROLLER FOR AIR-CONDITIONER FAN AND METHOD FOR CONTROLLING AIR-CONDITIONER FAN

CROSS-REFERENCE TO RELATED APPLICATIONS

Pursuant to 35 U.S.C. §119 and the Paris Convention Treaty, this application claims the benefit of Chinese Patent Application No. 201010109583.3 filed on Feb. 1, 2010, the contents of which are incorporated herein by reference.

BACKGROUND OF THE INVENTION

1. Field of the Invention

The invention relates to a motor controller for an air-conditioner fan and method for controlling thereof.

2. Description of the Related Art

Conventionally, selection and control commands in motor controllers for air-conditioner fans, and target values of gear positions of motors are preset by motor producers according to requirements of air-conditioner manufacturers. However, the following problems exist: 1) there are a variety of motor models corresponding to different air-conditioner models of the air-conditioner manufacturers, but they fail to change target values of gear positions of the motor controllers as required, and have to ask the motor producers for changing, or to buy new motors, which cause extra production time of the air-conditioners, and greatly increase production cost thereof; 2) the air-conditioner manufacturers may accumulate large amount of useless motors since the motors cannot meet requirements of other air-conditioner with different models for target values of gear positions and thus cannot be directly used by other air-conditioner control systems with different models, which results in tremendous waste and inconvenient production management.

SUMMARY OF THE INVENTION

In view of the above-described problem, it is one objective of the invention to provide a field programmable motor controller for an air-conditioner fan that is capable of addressing the above-mentioned problems, and allowing air-conditioner manufacturers to freely change target values of gear positions of a motor as required.

It is another objective of the invention to provide a control method for a motor controller for an air-conditioner fan that is capable of addressing the above-mentioned problems, and allowing air-conditioner manufacturers to freely change target values of gear positions of a motor as required, and features a variety of control functions.

To achieve the above objectives, in accordance with one embodiment of the invention, provided is a motor controller for an air-conditioner fan, comprising a central processor, a power drive module, a power supply module, and a communication interface circuit. The power supply module supplies working power to the central processor and the power drive module, multiple instruction input ports are connected to the central processor, multiple parameters are set in the central processor and corresponding to the instruction input ports, the central processor controls the power drive module to drive a motor of the air-conditioner fan to operate at a parameter corresponding to an instruction input port as the instruction input port is connected, the communication interface circuit is communicated with an external communication device, and the external communication device changes the parameters in the central processor corresponding to the instruction input ports via the communication interface circuit.

In a class of this embodiment, a mode-setting port is connected to the central processor, and operates to input a signal to the central processor whereby setting an operating mode of the motor.

In a class of this embodiment, the parameter in the central processor corresponding to the instruction input port is different in different operating modes of the motor.

In a class of this embodiment, the operating mode of the motor comprises a normal mode and a dehumidification mode.

In a class of this embodiment, the parameter is a rotating speed, a torque, or an air volume.

In a class of this embodiment, the communication interface circuit is a serial communication interface circuit disposed in the central processor.

In a class of this embodiment, the communication interface circuit is a serial communication interface circuit disposed outside the central processor.

In a class of this embodiment, the number of the instruction input ports is five.

In a class of this embodiment, it further comprises a detecting circuit operating to detect a position of a rotor of the motor, to obtain operating parameters of the motor, and to transmit the operating parameters to the central processor.

In a class of this embodiment, the external communication device comprises a programming device and a signal converter, and the signal converter operates to convert programs and parameters on the programming device to data that can be recognized and run by the central controller.

Advantages of the motor controller of the invention comprise: it implements field programming, allows air-conditioner manufacturers to freely change target values of gear positions of a motor as required, satisfies requirements of other models of air-conditioners for target values of gear positions of different motors, greatly saves cost of air-conditioners, reuses different models of motors accumulated in warehouses, facilitates integral management of motors with the same rotating speed, and reduces production and management cost.

In accordance with one embodiment of the invention, provided is a control method for a motor controller for an air-conditioner fan, the motor controller comprising a central processor, a power drive module, a power supply module, and a communication interface circuit, and the control method comprising: transmitting a control instruction to the central processor via an instruction input port, changing parameters in the center processor corresponding to different instruction input ports by the communication interface circuit, connecting to an instruction input port by the central processor, whereby obtaining a target value of a gear position corresponding to the instruction input port, and controlling a motor of the air-conditioner fan to operate at the target value by the power drive module.

In a class of this embodiment, it further comprises connecting the central processor to a mode-setting port.

In a class of this embodiment, it further comprises inputting a signal to the central processor by the mode-setting port whereby setting an operating mode of the motor.

In a class of this embodiment, the step of changing parameters in the center processor corresponding to different instruction input ports by the communication interface circuit comprises changing the parameters in the center processor corresponding to different instruction input ports via the communication interface circuit by an external communication device whereby enabling the motor to operate at the target value of a gear position.

In a class of this embodiment, the parameter is a rotating speed, a torque, or an air volume.

In a class of this embodiment, the operating mode of the motor comprises a normal mode and a dehumidification mode.

Advantages of the control method of the invention comprise: 1) it implements field programming, allows air-conditioner manufacturers to freely change target values of gear positions of a motor as required, satisfies requirements of other models of air-conditioners for target values of gear positions of different motors, greatly saves cost of air-conditioners, reuses different models of motors accumulated in warehouses, facilitates integral management of motors with the same rotating speed, and reduces production and management cost; 2) the control method is simple and practical, and control functions thereof are tremendous, which greatly satisfies requirements of air-conditioner manufacturers for use.

BRIEF DESCRIPTION OF THE DRAWINGS

The sole FIGURE shows a block diagram of a motor controller for an air-conditioner fan of an exemplary embodiment of the invention.

DETAILED DESCRIPTION OF THE EMBODIMENTS

Further description will be given below in conjunction with accompanying drawings and specific embodiments.

As shown in the sole FIGURE, a motor controller for an air-conditioner fan of the invention comprises a central processor, a power drive module, a power supply module, a detecting circuit, and a communication interface circuit. The power supply module supply working power to the central processor and the power drive module, multiple instruction input ports are connected to the central processor, multiple parameters N are set in the central processor and corresponding to the instruction input ports, the central processor controls the power drive module to drive a motor M of the air-conditioner fan to operate at a parameter N corresponding to an instruction input port as the instruction input port is connected, the communication interface circuit is communicated with an external communication device, and the external communication device changes the parameters N in the central processor corresponding to the instruction input ports via the communication interface circuit.

In this embodiment, the number of the instruction input ports is five: M1, M2, M3, M4, and M5.

A mode-setting port MODE is connected to an air-conditioner control system, and operates to input a signal to the central processor whereby setting an operating mode of the motor.

The parameter N in the central processor corresponding to the instruction input port is different in different operating modes of the motor, and the operating mode of the motor comprises a normal mode and a dehumidification mode.

Since the instruction input ports each has two parameters N in the normal mode and the dehumidification mode, the motor M is capable of operating at ten target value of gear positions.

The parameter N is a rotating speed, a torque, or an air volume.

The communication interface circuit is a serial communication interface circuit disposed in or outside the central processor.

The detecting circuit operates to detect a position of a rotor of the motor M, to obtain operating parameters of the motor, and to transmit the operating parameters to the central processor.

The external communication device comprises a programming device and a signal converter, and the signal converter operates to convert programs and parameters on the programming device to data that can be recognized and run by the central controller.

A control method for the above-mentioned motor controller comprises: an air-conditioner system transmits a control instruction to a central processor via an instruction input port, an external communication device changes parameters N in the center processor corresponding to different instruction input ports via a communication interface circuit, the central processor is connected to different instruction input port, whereby obtaining target values of gear positions corresponding thereto, and a power drive module controls a motor M of the air-conditioner fan to operate at the target values.

As the instruction input ports simultaneously receive control instructions corresponding to target values of gear positions, the central processor automatically executes control programs saved therein, and only uses a control instruction corresponding to the highest rotating speed of the motor after judgement and analysis, and the power drive module controls the motor M to operate at the target value corresponding to the highest rotating speed. For example, as the instruction input ports M1, M2, M3, and M4 are connected to the air-conditioner control system and simultaneously receive control instructions corresponding to target values of gear positions therefrom, the central processor automatically executes control programs saved therein, only uses a control instruction from the instruction control port M3, which is corresponding to the highest rotating speed of the motor, after judgement and analysis, and the power drive module controls the motor M to operate at the target value corresponding to the highest rotating speed.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method of controlling an air-conditioner fan using a motor controller, said motor controller comprising a central processor, a power drive module, a power supply module, and a communication interface circuit, said method comprising:
transmitting a control instruction to said central processor via an instruction input port;
changing parameters in said central processor corresponding to different instruction input ports by said communication interface circuit;
connecting to an instruction input port by said central processor, whereby obtaining a target value of a gear position corresponding to said instruction input port; and
controlling a motor of said air-conditioner fan to operate at said target value by said power drive module.

2. The method of claim 1, further comprising connecting said central processor to a mode-setting port.

3. The method of claim 2, further comprising inputting a signal to said central processor by said mode-setting port whereby setting an operating mode of said motor.

4. The method of claim 3, wherein the step of changing parameters N in said center processor corresponding to different instruction input ports by said communication interface circuit comprises changing said parameters N in said center processor corresponding to different instruction input ports via said communication interface circuit by an external communication device whereby enabling said motor to operate at said target value of a gear position.

5. The method of claim 1, wherein said parameter N is a rotating speed, a torque, or an air volume.

6. The method of claim 1, wherein said operating mode of said motor comprises a normal mode and a dehumidification mode.

* * * * *